US006996830B1

(12) United States Patent
Hamilton et al.

(10) Patent No.: US 6,996,830 B1
(45) Date of Patent: Feb. 7, 2006

(54) SYSTEM DETERMINING WHETHER TO ACTIVATE PUBLIC AND PRIVATE COMPONENTS OPERATING WITHIN MULTIPLE APPLICATIONS OF A COMPONENT-BASED COMPUTING SYSTEM

(75) Inventors: Keith S. Hamilton, Sammamish, WA (US); Steve Jamieson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 688 days.

(21) Appl. No.: 09/850,318

(22) Filed: May 7, 2001

(51) Int. Cl.
*G06F 15/16* (2006.01)

(52) U.S. Cl. ....................... 719/330; 719/313; 709/229

(58) Field of Classification Search ................ 709/225, 709/203, 229; 719/330, 313
See application file for complete search history.

(56) References Cited

U.S. PATENT DOCUMENTS

| | | | | |
|---|---|---|---|---|
| 5,941,943 | A | 8/1999 | Brenner et al. | |
| 5,996,013 | A | 11/1999 | Delp et al. | |
| 6,134,603 | A * | 10/2000 | Jones et al. | 719/330 |
| 6,151,700 | A * | 11/2000 | Fox | 717/107 |
| 6,249,836 | B1 | 6/2001 | Downs et al. | |
| 6,393,491 | B1 | 5/2002 | Bracha et al. | |
| 6,457,060 | B1 | 9/2002 | Martin et al. | |
| 6,509,913 | B2 | 1/2003 | Martin, Jr. et al. | |
| 6,523,065 | B1 | 2/2003 | Combs et al. | |
| 6,557,068 | B2 | 4/2003 | Riley et al. | |
| 6,594,671 | B1 | 7/2003 | Aman et al. | |
| 6,687,717 | B1 | 2/2004 | Hamilton et al. | |
| 6,751,797 | B1 * | 6/2004 | Desgranges et al. | 719/315 |
| 2002/0004850 | A1 * | 1/2002 | Sudarshan et al. | 709/313 |
| 2002/0113899 | A1 | 8/2002 | Swan | |
| 2002/0122061 | A1 | 9/2002 | Martin, Jr. et al. | |

OTHER PUBLICATIONS

Anne Thomas, Enterprise JavaBeans Technology: Server Component Model for the Java Platform, Dec. 1998, Patricia Seybold Group.*

Clarke et al., Ownership Types for Flexible Alias Protection, ACM, pp. 48-64 (Oct. 1998).

U.S. Appl. No. 09/850,289, "Method and System for Application Partitions," filed May 7, 2001.

U.S. Appl. No. 09/850,458, "Method and System for Application Partitions," filed May 7, 2001.

U.S. Appl. No. 09/850,489, "Method and System for Application Partitions," filed May 7, 2001.

* cited by examiner

*Primary Examiner*—Le Hien Luu
(74) *Attorney, Agent, or Firm*—Merchant & Gould P.C.

(57) ABSTRACT

A method, apparatus, and article of manufacture provide a component-based computing system having both publicly accessible and privately-only accessible computing components within multiple applications for providing component addressing/identification and naming spaces. A requested processing component is initiated by a calling component within a local computing system having one or more applications. The identity of the requested processing component, including an identity of a class ID and an identity of a partition from a request to activate a component initiated by a calling component, is obtained using configuration data for the requested component. The configuration data provides an indication of public-private status for the requested component. An instance of the requested component can be activated based on the public-private status.

17 Claims, 5 Drawing Sheets

SYSTEM DETERMINING WHETHER TO ACTIVATE PUBLIC AND PRIVATE COMPONENTS OPERATING WITHIN MULTIPLE APPLICATIONS OF A COMPONENT-BASED COMPUTING SYSTEM

TECHNICAL FIELD

The invention relates generally to a component-based computing system and more particularly to component-based computing system having both publicly accessible and privately-only accessible computing components within multiple applications within the computing system.

BACKGROUND

Object-oriented programming systems utilize collections of computer programming components executing within a system to form applications that provide a desired set of functionality. Components that possess authority to gain access to components present on a given system typically can identity and activate all other components that are presented on this system. This fact may allow processing systems to behave in manners that are different that initially intended as components attempt to access components that were not intended to be activated by a particular component.

This potential deficiency in component-based systems typically arises when a component in one collection of components that is viewed to be a single application attempts to access components resident within a second application resident on the same computing system. No mechanism exists in current component based systems to confine activation calls for components between these applications to a small, well-defined set of access points. As such, component based systems may be vulnerable to several different types of inappropriate and unauthorized behavior by applications.

Computing systems developed prior to the creation of component-based systems did not necessarily suffer this system deficiency as executable sets of processing modules were linked together into a single executable module that accessed processing resources through the use of system calls to an operating system. As such, the entry points to executable modules was both well defined and under the control of a system administrator. Access to these system calls could be monitored and limited if appropriate.

This situation is different in component based computing systems in which one component may call a second component which in turn may call a third component. This sequence of calls may extend to any number of levels. The various components may be developed by different individuals for completely different purposes. The net result of these combinations of component calls may not be well understood or easily traceable until inappropriate behavior has occurred.

SUMMARY

The present invention relates to a method, apparatus, and article of manufacture for providing a component-based computing system having both publicly accessible and privately-only accessible computing components within multiple applications for providing component addressing/identification and naming spaces.

A system in accordance with the principles of the present invention includes a computing system for activating a requested processing component initiated by a calling component within a local computing system. The computing system has an application activation control module for receiving a request to activate a component initiated by a calling component and activating an instance of the requested component, and an application identity module for determining the identity of one or more applications used to identify the requested processing component, a permit object activation module for determining whether an instance of the requested component may be activated.

Other embodiments of a system in accordance with the principles of the invention may include alternative or optional additional aspects. One such aspect of the present invention is a method and computer data product encoding instructions for activating a requested processing component initiated by a calling component within a local computing system having two or more applications. The method determines the identity of the requested processing component, including an identity of a class ID and an identity of an application from a request to activate a component initiated by a calling component and obtains configuration data for the requested component, the configuration data comprises an indication of public-private status for the requested component. If the configuration data indicates that the requested component is a public component, an instance of the requested component is activated. If the configuration data indicates that the requested component is a private component, the method determines if the requested component is a member of an application that also includes the calling component as a member. If the requested component and the calling component are members of the same application, an instance of the requested component is activated.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION

The present invention relates to a code generation method, apparatus, and article of manufacture for providing a component-based computing system having both publicly accessible and privately-only accessible computing components within multiple applications within a component based computer system.

Figure 1:
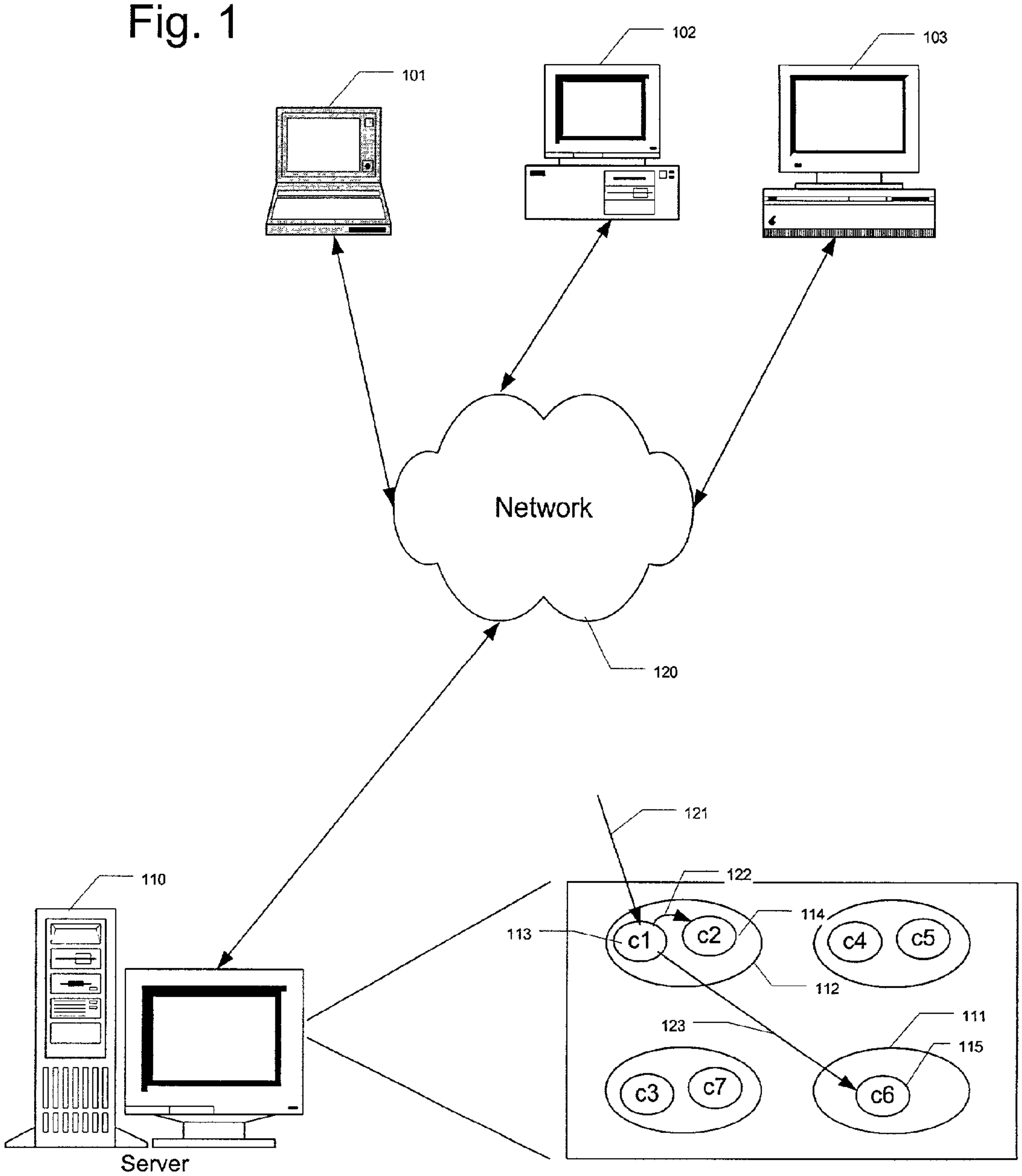
FIG. 1 illustrates a distributed computing environment for using public and private components within multiple applications located on a remote server according to an example embodiment of the present invention.

FIG. 1 illustrates a distributed computing environment for using public and private components within multiple applications located on a remote server according to an example embodiment of the present invention. In an exemplary embodiment, remotely located client computing systems 101–103 access programmable computing processing components on a remote server 110 across a communications network 120. Within the server 110, at least two programming applications are included.

When an active component on the server 110 needs to activate additional components to complete one or more processing tasks, the component selected for activation using the ID of the original calling client to determine where to find the component to be selected. While this example embodiment operates within a client-server environment, one skilled in the art will recognize that the use of multiple applications within component-based computing systems as disclosed herein is not limited to such a programming environment as the client processes that cause components to be activated according to the present invention as recited within the attached claims may also be located within the server as well as being located within remote client computing systems 101–103.

The processing performed pursuant to the present invention corresponds to the process followed when a component is activated. These components are typically individual object-oriented programming modules and the process of activating a component corresponds to the process of creating an instance of the component that is to be used to provide a function or operation to be performed for a given client 101–103. Once a component has been instantiated and is active in response to a component activation call 121, the instance of the component may be called one or more times to perform a desired operation. However, the processing associated with the present invention typically concerns the processing performed to identify the component when it is being activated and instantiated, rather than when the already active instance of the component is called a second time. The activated component c1 113 may itself make an activation call 122 to a component c2 114 that is part of the same application 112 or may make an activation call 123 to component c6 115 that is part of a second application 111.

Figure 2:
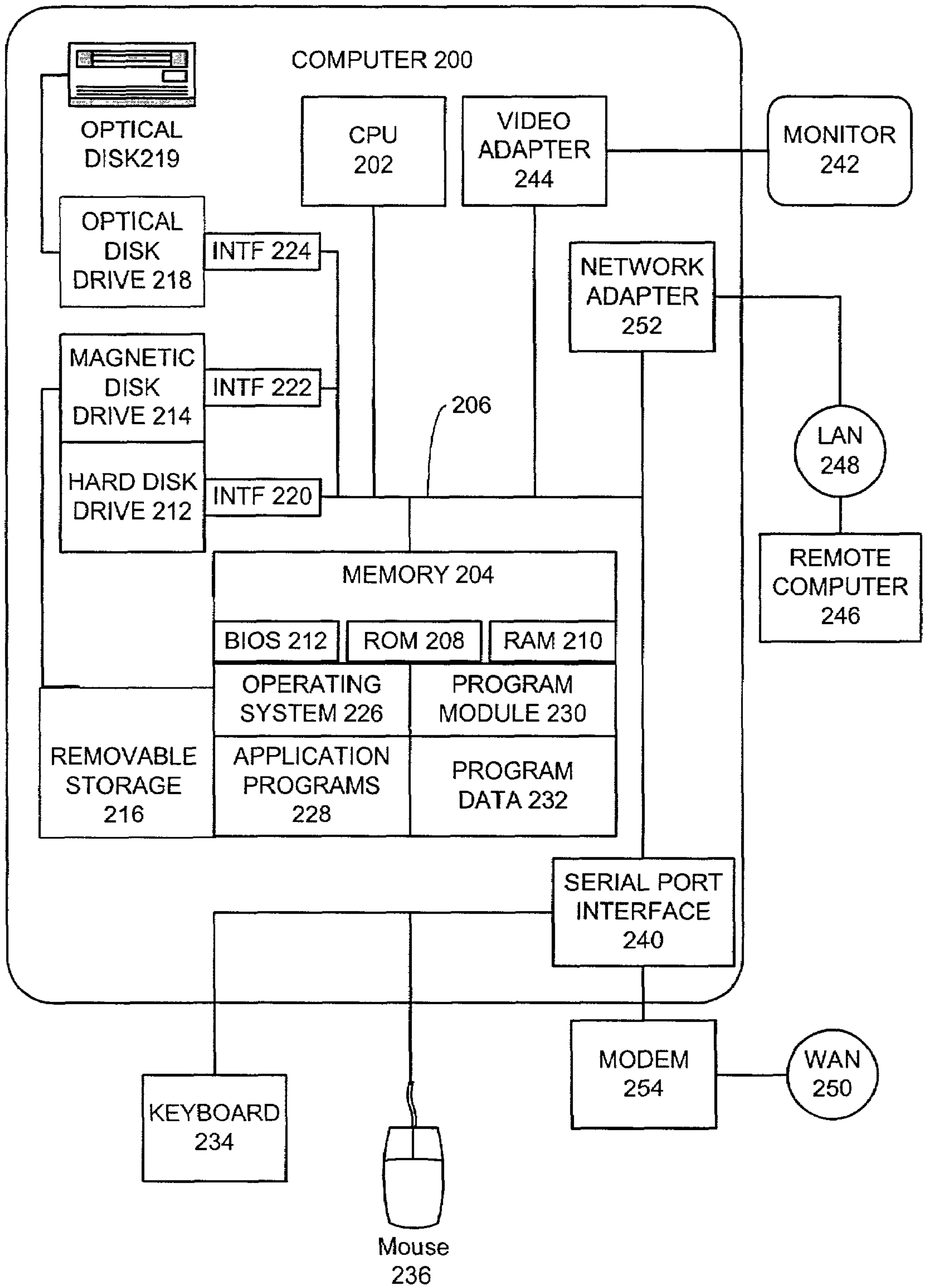
FIG. 2 illustrates an exemplary computing system useful for implementing an embodiment of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
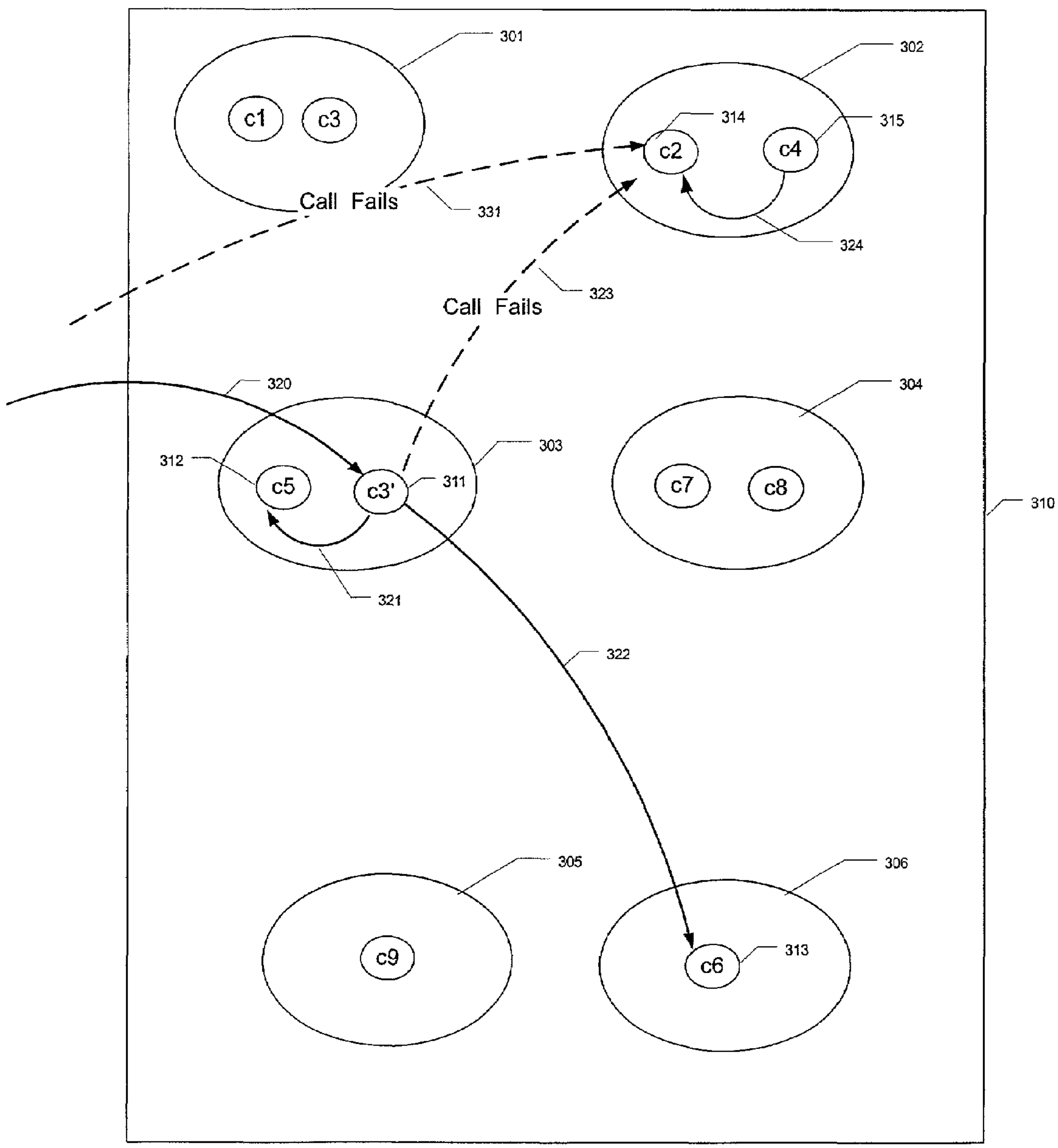
FIG. 3 illustrates multiple applications containing programmable components within a remote server in an embodiment of the present invention.

FIG. 3 illustrates multiple applications containing programmable components within a remote server in an embodiment of the present invention. Computing system 310 may contain one or more applications, 301–306. Each application 301–306 is a collection of object oriented components 311–313 that operate together to perform a processing function or task. Currently, systems allow any programming object who may access a component within a computer system to identify and activate any component within the system regardless of whether the component to be activated is located within a given application or not.

First consider an activation call 320 made from outside server 310 to components c3' 311 within application 303. In this example, component c3' 311 is configured to be a public component. This property of the components is specified using configuration data accessed when the component is activated and is used by the server 310 to determine if a component may be activated.

Component c3' 311, being a public component, may be activated by a call 320 initiated by any remote component. When a component is designated as a public component, the component may be activated by a component located within any other application whether the application is located on server 110 or any other remote computing system. The component may, if desired, impose other security checks to determine whether the component may be activated. These additional security checks may be based upon ownership of the component, membership within an authorized group or user ID, or similar security protocols typically used to grant and deny access to a computer resource.

In contrast, a private component, such as c2 314, may only be activated by a call 324 initiated by a component within the same application 302. An external call 331 attempting to activate component c2 314 will fail. Component c2 314 may only be activated by a call 324 initiated within its application 302.

Similarly, an activation call 322 initiating activation of component c6 313 is successful if component c6 313 is a public component. Component c3' 311 may also initiate a call 321 to activate component c5 regardless of the public/private property of component c5 312 since both of these components are within the same application 303. For the same reasoning discussed above, component c3' 311 may not activate component c2 314 with an activation call 324 because component c2 314 and component c3' 311 are not located within the same application.

Figure 4:
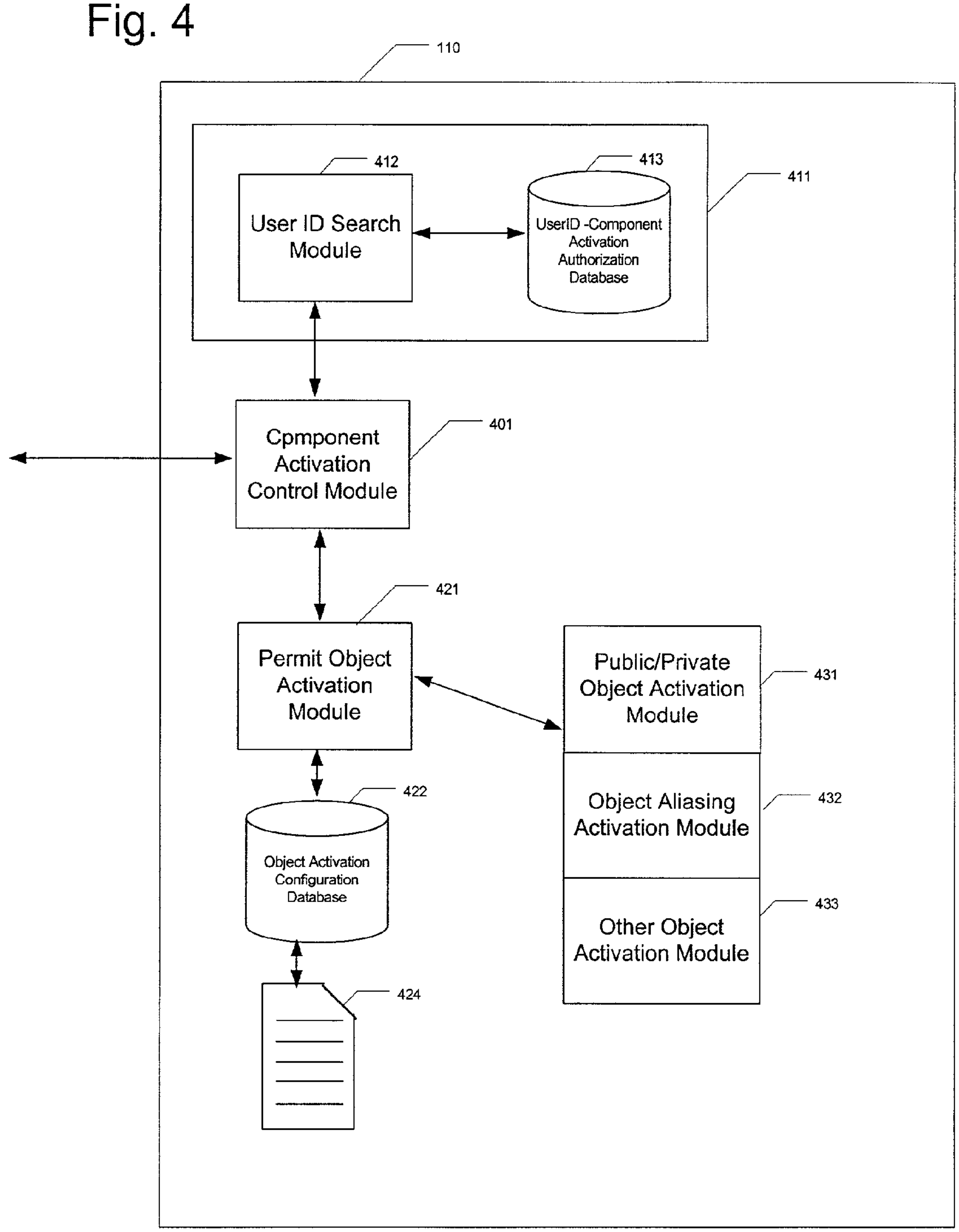
FIG. 4 illustrates a computing system for processing component activation using public and private components within multiple applications according to yet another example embodiment of the present invention.

FIG. 4 illustrates a computing system for processing component activation using public and private components within multiple applications according to yet another example embodiment of the present invention. Processing calls that require the activation of a component are received by a component activation control module 401. The control module 401 first determines the application of the component to be called, determines if the component may be activated, and, if appropriate, activates the appropriate component.

The control module 401 obtains the ID of the application containing the component and any corresponding activation authorization before proceeding from a component authorization module 411. This component activation module 411 contains a user ID search module 412 and a user ID-component activation authorization database 413 to determine the needed information. The user ID search module 412 receives a request from the control module 401 and looks up the ID of the user making the request to activate a component in the database 413. If a match is found, the corresponding default application ID is retrieved and returned to the control module 401 for further processing. If no match is found, either an error or a default value is returned.

In the above embodiment, the application identity module 411 corresponds to a directory service typically found on networks for providing user ID based configuration and security data. The component authorization module 411 is typically a centrally located data store that provides the requested information upon request. One skilled in the art will recognize that this database may be located anywhere in the computing system so long as it provides the information needed by the present invention as recited within the attached claims.

The control module 401 uses the returned information to cause a permit object activation module 421 to activate an instance of the requested component. Finally, the activation module 421 retrieves a configuration data record 424 from an Object Activation Configuration database 422 to determine if the activation of the object requires the use of one or more activators 431–433 to activate an instance of a component using a process such as component aliases, public/private components, and any other type of component activation processing desired. The decision to successfully activate a public and private component as discussed above is performed by a public/private activation module 431. Other activation modules 432–433 perform any required processing to implement their respective functions. The activation of components may use one or more of these activation modules 431–433. Which of these modules 431–433, and the order in which any of these modules 431–433, are used when a component is activated in response to a given request is specified within the configuration data record 424.

Figure 5:
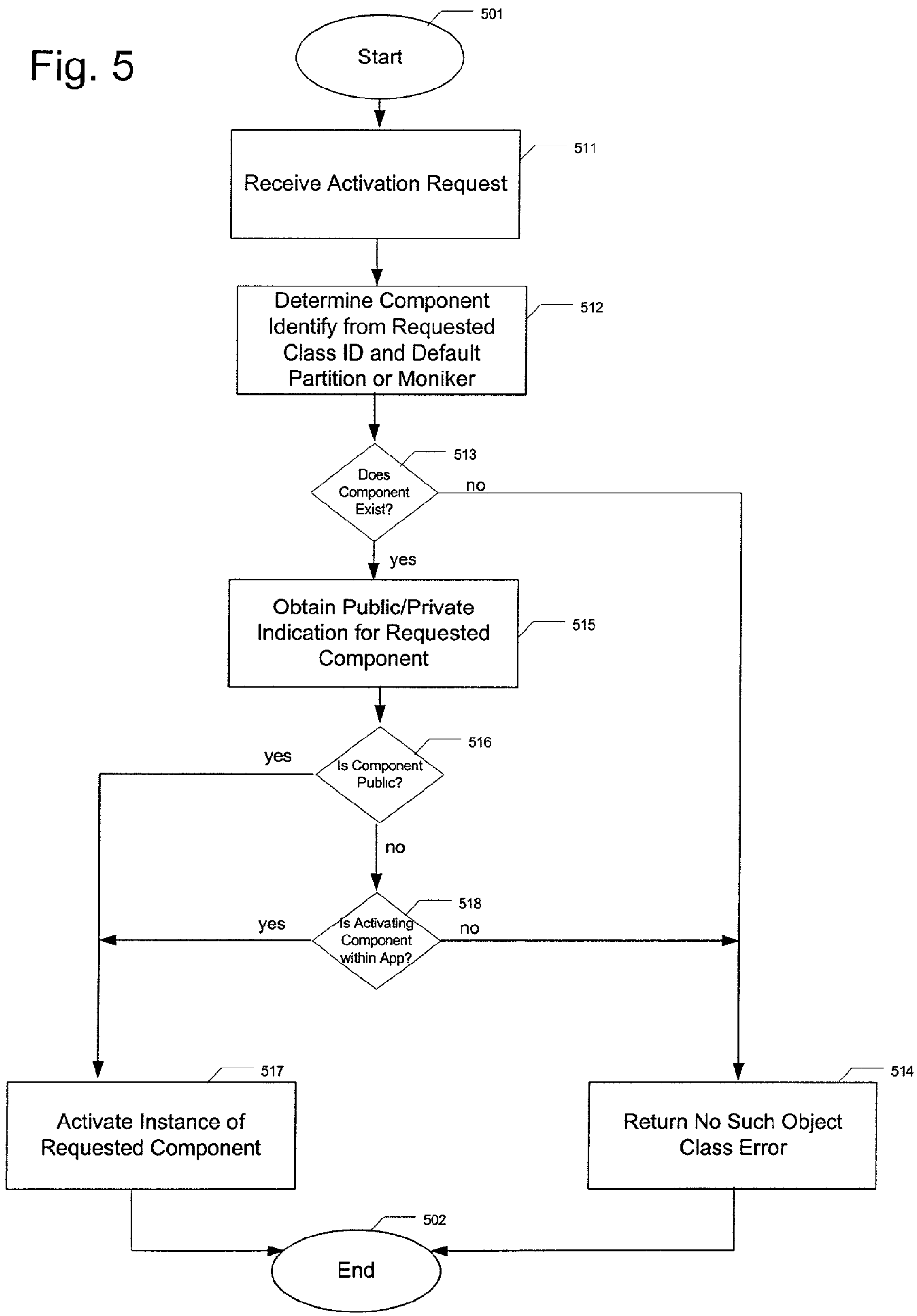
FIG. 5 illustrates a process flow diagram representing the processing performed as part of component activation using public and private components within multiple applications according to yet another example embodiment of the present invention.

FIG. 5 illustrates a process flow diagram representing the processing performed as part of component activation using public and private components within multiple applications according to yet another example embodiment of the present invention. The process flow begins 501 as the process proceeds to a receive activation request module 511. The receive module 511 receives an activation request from a calling component that seeks to activate a non-active component within the server 110.

Once the request is received, the process, in module 512, determines the identity of the component to be activated from the identity of the requested class ID. Test module 513 determines if the corresponding component exists. If the requested component does not exist, the processing proceeds to an error module 514 to generate and return a no such object class error message to the calling component before the process ends 502.

If test module 513 determines that the requested component exists, the processing obtains the public/private indication data for the requested component in module 515. Test module 516 uses the data obtained in module 515 to determine if the requested component is a public component. If test module 516 determines that the requested component is a public component, an instance of the component is activated by module 517 and the process ends 502.

If test module 516 determines that the requested component is a private component, test module 518 determines if the calling component is within the same application as the requested component. If test module 518 determines that the requested component is within the same application, an instance of the component is activated by module 517 and the process ends 502. If test module 518 determines that the requested component is not within the same application, an error message is generated by error module 514 before the process ends 502.

FIG. 2 illustrates an example of a suitable operating environment 110 in which the invention may be implemented. The operating environment is only one example of a suitable operating environment 110 and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

A network server 110 typically includes at least some form of computer readable media. Computer readable media can be any available media that can be accessed by the network server 110. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by the network server 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

While the above embodiments of the present invention describe a network based processing system providing processing services to remote clients, one skilled in the art will recognize that the various distributed computing architectures may be used to implement the present invention as recited within the attached claims. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for providing network based processing system providing processing services to remote clients.

What is claimed is:

1. A computer implemented method of activating a requested processing component initiated by a calling component within a local computing system having one or more applications, the method comprising:

activating an instance of an application associated with one or more processing components;

receiving a request from a calling component to activate one of the processing components associated with the application;

determining an identity of the requested processing component, including an identity of a class ID from the request to activate the requested component initiated by the calling component;

obtaining configuration data for the requested component, the configuration data comprising an indication of public-private status for the requested component;

if the configuration data indicates that the requested component is a public component, activating an instance of the requested component;

if the configuration data indicates that the requested component is a private component, performing the following:

determining if the requested component is a member of the application that also includes the calling component as a member; and if the requested component and the calling component are members of the same application, activating an instance of the requested component.

2. The method according to claim 1, wherein the identity of the calling component corresponds to an identity obtained from a central directory service.

3. The method according to claim 2, wherein the central directory service communicates with the local computer over a communications network.

4. The method according to claim 1, wherein the calling component is located on a remote computing system.

5. The method according to claim 4, wherein the calling component transmits the request to activate a component to the local computing system across a communications network.

6. The method according to claim 5, wherein the communications network is the Internet.

7. A computer implemented method of activating a requested processing component initiated by a calling component within a local computing system having one or more applications, the method comprising:

determining an identity of the requested processing component, including an identity of a class ID and an identity of an application from a request to activate a component initiated by a calling component;

activating an instance of an application associated with one or more processing components;

receiving a request from a calling component to activate one of the processing components associated with the application;

obtaining configuration data for the requested component, the configuration data comprising an indication of public-private status for the requested component;

if the configuration data indicates that the requested component is a public component, activating an instance of the requested component;

if the configuration data indicates that the requested component is a private component, performing the following:

determining if the requested component is a member of the application that also includes the calling component as a member; and if the requested component and the calling component are members of the same application, activating an instance of the requested component;

wherein the identity of the calling component corresponds to an identity obtained from a central directory service; and the calling component is located on a remote computing system that transmits the request to activate a component to the local computing system across a communications network.

8. A computer program data product containing computer readable medium encoding instructions for a method for activating a requested processing component initiated by a calling component within a local computing system having one or more applications, the method comprising:

activating an instance of an application associated with one or more processing components;

receiving a request from a calling component to activate one of the processing components associated with the application;

determining an identity of the requested processing component, including an identity of a class ID and an identity of a partition from the request to activate the requested component initiated by the calling component;

obtaining configuration data for the requested component, the configuration data comprising an indication of public-private status for the requested component;

if the configuration data indicates that the requested component is a public component, activating an instance of the requested component;

if the configuration data indicates that the requested component is a private component, performing the following:

determining if the requested component is a member of the application that also includes the calling component as a member; and if the requested component and the calling component are members of the same application, activating an instance of the requested component.

9. The computer data product according to claim 8, wherein the identity of the calling component corresponds to an identity obtained from a central directory service.

10. The computer data product according to claim 9, wherein the central directory service communicates with the local computer over a communications network.

11. The computer data product according to claim 8, wherein the calling component is located on a remote computing system.

12. The computer data product according to claim 11, wherein the calling component transmits the request to activate a component to the local computing system across a communications network.

13. The computer data product according to claim 12, wherein the communications network is the Internet.

14. The computer data product according to claim 8, wherein the computer data product comprises a computer-readable medium having stored thereon a set of computer instructions.

15. The computer data product according to claim 8, wherein the computer data product comprises a computer data signal embodied in a carrier wave readable by a computing system and encoding a set of computer instructions.

16. A computing system for activating a requested processing component initiated by a calling component within a local computing system having one or more applications, the computing system comprising:

an activated application associated with one or more processing components;

an activation control module for receiving a request to activate one of the processing components associated with the application, the request being initiated by a calling component and activating an instance of the requested component;

an application identity module for determining an identity of one or more applications used to identify the requested processing component; and a permit object activation module for determining whether an instance of the requested component can be activated, the permit object activation module using configuration data including a value of a public/private property to determine whether the request component can be activated, wherein the permit object activation module is programmed to:

if the configuration data indicates that the requested component is a public component, the permit object activation module allows activation of an instance of the requested component;

if the configuration data indicates that the requested component is a private component:

the permit object activation module determines if the requested component is a member of the application that also includes the calling component as a member; and if the requested component and the calling component are members of the same application, the permit object activation module allows activation of an instance of the requested component.

17. The computing system according to claim 16, wherein the application identity module obtains the identity of the calling component from a central directory service.

* * * * *